United States Patent
Weber et al.

(10) Patent No.: US 11,637,468 B2
(45) Date of Patent: Apr. 25, 2023

(54) ROTOR FOR AN ELECTRIC MACHINE

(71) Applicant: AUDI AG, Ingolstadt (DE)

(72) Inventors: Korbinian Weber, Ingolstadt (DE); Lars Wetterau, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 169 days.

(21) Appl. No.: 16/793,135

(22) Filed: Feb. 18, 2020

(65) Prior Publication Data

US 2020/0321817 A1 Oct. 8, 2020

(30) Foreign Application Priority Data

Apr. 8, 2019 (DE) .......................... 102019204960.5

(51) Int. Cl.
*H02K 1/32* (2006.01)
*H02K 1/27* (2022.01)
*H02K 1/276* (2022.01)

(52) U.S. Cl.
CPC ............... *H02K 1/32* (2013.01); *H02K 1/276* (2013.01)

(58) Field of Classification Search
CPC ........ H02K 1/276; H02K 1/32; H02K 1/2766; H02K 2213/03
USPC .......................................................... 310/61
See application file for complete search history.

(56) References Cited

U.S. PATENT DOCUMENTS

| | | | | |
|---|---|---|---|---|
| 3,997,803 A | * | 12/1976 | Mishra | H02K 1/28 310/59 |
| 4,339,873 A | * | 7/1982 | Kanamaru | F16D 1/072 29/598 |
| 5,986,366 A | * | 11/1999 | Bailey | H02K 9/00 417/353 |
| 2007/0120429 A1 | * | 5/2007 | Howard | H02K 3/527 310/61 |
| 2009/0261667 A1 | * | 10/2009 | Matsubara | H02K 1/2766 310/54 |
| 2011/0081263 A1 | * | 4/2011 | Yoshino | F04C 23/008 417/410.1 |
| 2015/0137632 A1 | * | 5/2015 | Takahashi | H02K 1/2766 310/54 |

(Continued)

FOREIGN PATENT DOCUMENTS

CN 203537098 U 4/2014
CN 103944297 A 7/2014
(Continued)

OTHER PUBLICATIONS

Translation of foreign document CN 103944297 A (Year: 2014).*
(Continued)

*Primary Examiner* — Alex W Mok
(74) *Attorney, Agent, or Firm* — Maier & Maier, PLLC

(57) ABSTRACT

A rotor for an electric machine, having a laminated core, which is arranged on a shaft and provided with magnets. Multiple individual adjoining plates pushed onto a shaft or of partial laminated cores having multiple plates have a central borehole accommodating the shaft. At least a part of the plates or partial laminated cores are pushed onto the shaft pivoted by a predetermined pivot angle ($\alpha$). Every plate or partial laminated core includes multiple coolant passages arranged distributed around the center (Z) of the borehole. The angle offset of two adjacent coolant passages corresponds to the pivot angle ($\alpha$).

5 Claims, 2 Drawing Sheets

(56) References Cited

U.S. PATENT DOCUMENTS

2015/0219187 A1* 8/2015 Saito .................. F16H 1/32
   475/149
2016/0261158 A1   9/2016 Horii et al.

FOREIGN PATENT DOCUMENTS

| CN | 207968110 U | 10/2018 | | |
| DE | 102006046231 A1 | 4/2008 | | |
| WO | WO-2017125371 A1 * | 7/2017 | | |
| WO | WO-2018210561 A1 * | 11/2018 | ........... | H02K 1/2766 |

OTHER PUBLICATIONS

Examination Report dated Jul. 26, 2019 in corresponding German application No. 102019204960.5; 20 pages including Machine-generated English-language translation.

Office Action dated Mar. 3, 2022 in Chinese Application No. 202010235105.0; 12 pages including English-language translation.

* cited by examiner

ROTOR FOR AN ELECTRIC MACHINE

FIELD

The disclosure relates to a rotor for an electric machine, having a laminated core, which is arranged on a shaft, is provided with magnets, and consists of multiple individual adjoining plates pushed onto a shaft or of partial laminated cores consisting of multiple plates having a central borehole accommodating the shaft, wherein at least part of the plates or the laminated cores are pushed onto the shaft pivoted by a predetermined pivot angle.

BACKGROUND

Electric machines, in particular permanent magnet-excited synchronous machines, typically have a rotor consisting of a shaft, a laminated core arranged on the shaft having magnets provided thereon, and a weight disk or completion disk at each end of the laminated core. The laminated core itself consists either of individual plates pushed in succession onto the shaft or of multiple axially shorter partial laminated cores, which each consist of multiple separate individual plates. To ensure the most uniform possible torque generation and thus a reduction of the torque ripple of the electric machine, the plates or partial laminated cores, respectively, are typically arranged slightly pivoted in relation to one another on the shaft, i.e., pushed on offset by a predetermined pivot angle. This pivot angle is also referred to as the "staggering angle".

In operation of the electric machine, the rotor heats up because of energy loss, wherein most of the energy loss arises close to the outer circumference in operation in these rotors. In this case, both the laminated core and also the core-side integrated magnets function as a source of loss. To cool such a rotor, having a coolant fluid flow through the shaft is known. However, this is disadvantageous insofar as a longer heat removal path is provided from the exterior region of the rotor through the laminated core and the shaft-hub connection up to the cooled inner surface of the hollow shaft.

The disclosure is therefore based on the problem of specifying a rotor having improved cooling.

To solve this problem, it is provided according to the disclosure, in a rotor of the type mentioned at the outset, that each plate or partial laminated core comprises multiple coolant passages arranged distributed around the center of the borehole, wherein the angle offset of two adjacent boreholes corresponds to the pivot angle.

SUMMARY

According to the disclosure, each plate or each partial laminated core is provided with a plurality of coolant passages, which are formed distributed around the center of the borehole, i.e., on a corresponding defined radius. The passage picture of all plates or partial plates is identical, i.e., the production of the plates or partial laminated cores can thus be standardized and all plates of a rotor can typically be stamped in the same manner.

According to the disclosure, the angle offset of two adjacent boreholes is selected in such a way that it exactly corresponds to the pivot angle, i.e., the staggering angle, by which the plates or partial laminated cores are pushed offset onto the shaft. This means that the indexing angle of the coolant passages corresponds to the staggering angle.

This particularly advantageously enables the plates or partial laminated cores to be pushed on correspondingly offset, wherein the coolant passages align with one another in spite of pivoted pushing-on and in this manner cooling cavities extending axially through the rotor result, without a variation being provided within the plate or partial laminated core design.

Since multiple coolant passages are arranged around the center of the borehole of the plates or partial laminated cores, which can be kept relatively small with respect to passage diameter, a correspondingly large number of cooling ducts or cavities extending axially through the rotor as such can be formed, so that because of the plurality of these individual ducts, a large cooled surface is provided in total inside the rotor, which results in a high cooling effect having short heat removal paths, since as described, the coolant passages are formed on the side of the plate or partial laminated core and are accordingly located significantly closer to the location of the lost energy introduction and thus the strong heating than would be the case with shaft cooling.

In addition, the comparatively small, many cavities are less susceptible to acceleration and deceleration procedures inside the rotor, since the cooling area is not significantly reduced even in the event of an acceleration-related displacement of coolant fluid. This means that the cooling performance is maintained even during dynamic operation.

Every borehole of a plate or a partial laminated core expediently comprises an internal toothing for a rotationally-fixed connection to the shaft, using which it is pushed onto an external toothing of the shaft, wherein the coolant passages are formed adjacent to the internal toothing. In this case, the angle offset of the coolant passages can correspond to the angle offset of the internal toothing. Since the possible pivot or staggering angle is defined via the indexing angle of the internal toothing and thus also the shaft-side external toothing, the angle offset of the coolant passages is expediently oriented to the angle offset of the internal toothing, i.e., the indexing of the coolant passages corresponds to the indexing of the internal toothing.

The coolant feedthroughs are preferably arranged in this case in radial extension of the valleys between two teeth of the internal toothing and are open toward the borehole. According to this disclosure alternative, the coolant feedthroughs are thus applied in such a way that they are arranged in direct radial extension of the valleys between two internal toothing teeth, wherein these valleys extend quasi-radially on the internal circumference of the borehole into the respective plate or partial laminated core, respectively. The coolant passages are arranged in such a way that they are open toward these valleys, and are thus open toward the borehole. This is accompanied by the particular advantage that the corresponding coolant passages can also be formed simultaneously with the formation of the borehole, i.e., both the borehole and also the coolant passages can be formed, typically stamped out, using a common tool.

Alternatively thereto, the option exists of also forming the coolant passages as closed passages, wherein in this case they do not necessarily have to be arranged in radial extension of the valleys between two internal toothing teeth, but rather can also be positioned in radial extension of the teeth, or also offset in between, as long as the indexing angle of the coolant passages corresponds to the indexing angle of the internal toothing.

The coolant passages themselves are preferably stamped, as typically each plate is also formed in a stamping method.

In addition to the rotor itself, the disclosure furthermore relates to an electric machine comprising a rotor of the above-described type. The electric machine is preferably a permanent-magnet-excited synchronous machine.

BRIEF DESCRIPTION OF THE DRAWINGS

Further advantages and details of the present disclosure result from the exemplary embodiments described hereafter and on the basis of the drawings. In the figures.

DETAILED DESCRIPTION

Figure 1:
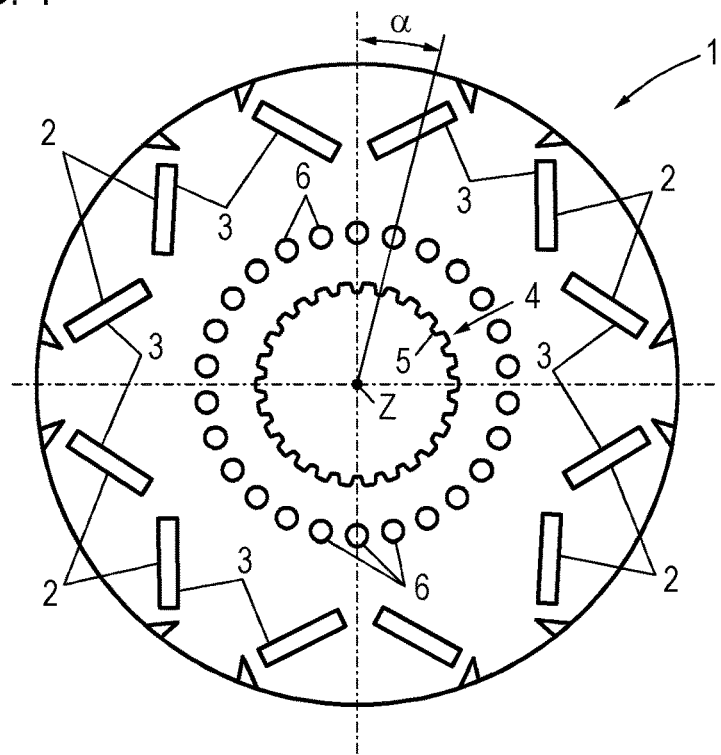
FIG. 1 shows a schematic illustration of a partial laminated core, consisting of multiple individual plates, having integrated magnets and coolant passages arranged in the partial laminated core.

FIG. 1 shows a schematic illustration of a partial laminated core 1, which typically consists of multiple separate plates arranged in succession, which are packaged to form the partial laminated core 1. A plurality of passages 2 are formed on the plates or the partial laminated core 1, respectively, which passages extend longitudinally, i.e., in the axial direction, through the partial laminated core 1, and in which permanent magnets 3 are inserted, for example, adhesively bonded in.

Furthermore, a borehole 4 is preferably also provided, which comprises an internal toothing 5, using which the partial laminated core 1 is pushed onto a shaft comprising an external toothing.

A plurality of individual, relatively small coolant passages 6 are formed distributed around the center Z of the borehole 4 and spaced apart equidistantly from one another. They are all located at the same radius and are spaced apart from one another in the circumferential direction by a defined angle α.

This angle α exactly corresponds to the pivot or staggering angle by which two adjacent laminated cores can be pushed offset in relation to one another onto the shaft. Since this staggering angle is defined by the indexing of the internal toothing 5, the indexing of the coolant passages 6 accordingly corresponds to the indexing of the internal toothing 5.

This arrangement according to the disclosure of the coolant passages 6 has the result that the coolant passages 6 of two adjacent partial laminated cores 1 are aligned with one another viewed axially, even if the partial laminated cores 1 are pushed onto the shaft offset by the pivot or staggering angle α. This is because in spite of this angle offset of the partial laminated cores 1, the coolant passages 6 are located congruently one over another viewed axially, so that coolant ducts extending axially through the rotor form due to the coolant passages communicating with one another. Since a plurality of such small coolant passages 6 are provided, accordingly a plurality of coolant ducts which are small in cross section forms, which in total form a remarkably large surface, at which a heat transfer is enabled from heating rotor material to the coolant fluid flowing through the coolant ducts.

Figure 2:
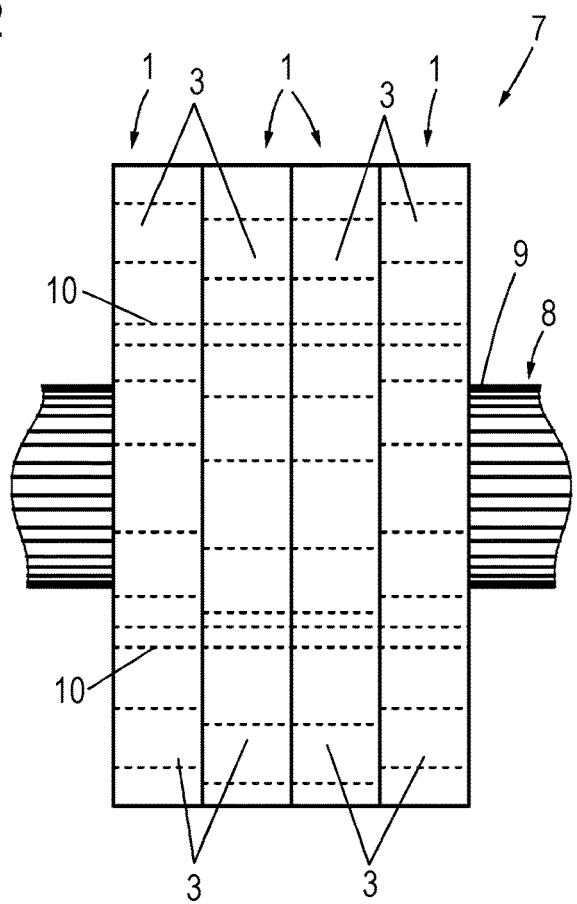
FIG. 2 shows a side view of a rotor having four partial laminated cores placed on a shaft and arranged offset by a staggering angle.

FIG. 2 shows a schematic illustration of a rotor 7 according to the disclosure, in which in the exemplary embodiment shown, four partial laminated cores 1 forming the laminated core are pushed axially in succession onto a shaft 8, which comprises an external toothing 9. The buried magnets 3 are indicated via the dashed lines, wherein it is apparent on the basis of the location of the magnets 3 that the partial laminated cores 1 are pushed on pivoted in relation to one another by the pivot or staggering angle α. The two outer partial laminated cores 1 are each arranged pivoted by the angle α in relation to the two partial laminated cores located farther inward, wherein the two inner partial laminated cores are pushed on in identical alignment.

Independently of this pivot angle, all coolant passages 6 of the four partial laminated cores 1 are all located axially aligned with one another, so that a plurality of individual coolant ducts 10 extending axially through the rotor 7 results, wherein only two such coolant ducts 10 are shown by dashed lines in FIG. 2.

Figure 3:
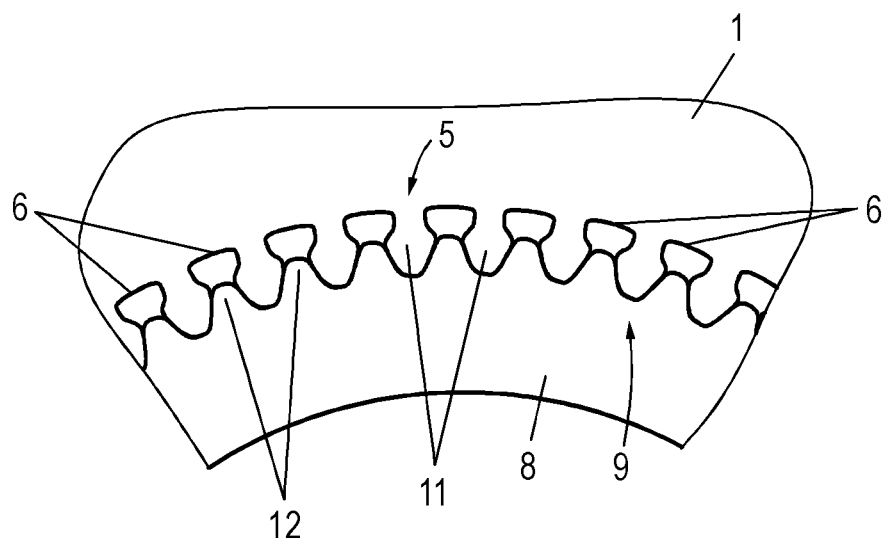
FIG. 3 shows a partial view of a rotor with illustration of the connecting region of shaft to plate or partial laminated core, respectively, having coolant passages open toward the borehole.

FIG. 3 shows a first schematic illustration relating to the arrangement and formation of the coolant passages 6. A detail is shown from the region of the toothing coupling of a plate or partial laminated core 1 and the shaft 8. It can be seen that the teeth 11 of the internal toothing 5 engage between the teeth 12 of the external toothing 9, so that a rotationally-fixed toothing engagement results.

All coolant passages 6 are arranged in radial extension of the valleys of the internal toothing 5 provided between two teeth 11. They are open in this case toward the borehole 4, i.e., in the scope of the production, the coolant passages 6 can be stamped out together with the borehole 4, for which a single tool can be used. The coolant ducts 10 are accordingly closed via the respective plate or partial laminated core 1 viewed radially, on the one hand, and are closed radially inward via the teeth 12 of the external toothing 9 of the shaft 8, on the other hand.

Figure 4:
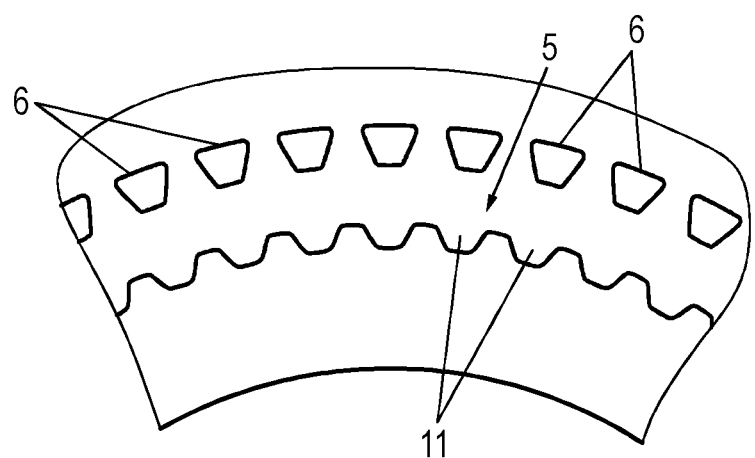
FIG. 4 shows a view corresponding to FIG. 3 having closed coolant passages.

FIG. 4 shows an alternative design thereto. Therein, the coolant passages 6 are formed as separate, closed boreholes located farther radially outward than the internal toothing 5. In this example shown, they are formed in radial extension of the teeth 11 of the internal toothing 5, but nonetheless the indexing of the coolant passages 6 also corresponds to the indexing of the internal toothing 5 here. In this design, the coolant passages 6 and accordingly also the coolant ducts 10 are located farther radially outward, i.e., closer to the location of the strongest lost power introduction, which is located as described in the outer region of the rotor, where the magnets 3 are integrated.

Although FIG. 4 shows a formation of the coolant passages 6 in radial extension of the teeth 11, it would similarly also be conceivable to form the coolant passages 6 in radial extension of the valleys located between two teeth 11, or also between the teeth and valleys, as long as the indexing of the coolant passages 6 corresponds to the indexing of the internal toothing 5.

The invention claimed is:

1. A rotor for an electric machine, having a laminated core, which is arranged on a shaft and provided with magnets, comprising:
   multiple individual adjoining plates pushed onto a shaft or of partial laminated cores with multiple plates having a central borehole accommodating the shaft, wherein at least a part of the plates or partial laminated cores are pushed onto the shaft with the plates or partial laminated cores stacked adjacent to each other in an axial direction of the shaft, at least one plate or partial laminated core being circumferentially offset from an axially adjacent plate or partial laminated core by a predetermined rotation angle (α), each borehole comprising an internal toothing, pushed onto an external toothing of the shaft; wherein every plate or partial laminated core includes multiple coolant passages arranged distributed around the center (Z) of the borehole, wherein the angle offset of two adjacent coolant passages corresponds to the rotation angle ($\alpha$) and an angle offset of the internal toothing, such that independently of the rotation angle, all coolant passages of every plate or partial laminated core are located axially aligned with one another, extend axially through the rotor, and parallel to the shaft.

2. The rotor according to claim 1, wherein the coolant passages are arranged in radial extension of valleys between two teeth of the internal toothing and are open toward the borehole.

3. The rotor according to claim 1, wherein the coolant passages are closed passages.

4. The rotor according to claim 1, wherein the coolant passages are stamped.

5. An electric machine, comprising a rotor having a laminated core, which is arranged on a shaft and provided with magnets, consisting of multiple individual adjoining plates pushed onto a shaft or of partial laminated cores consisting of multiple plates having a central borehole accommodating the shaft, wherein at least a part of the plates or partial laminated cores are pushed onto the shaft with the plates or partial laminated cores stacked adjacent to each other in an axial direction of the shaft, at least one plate or partial laminated core being circumferentially offset from an axially adjacent plate or partial laminated core by a predetermined rotation angle ($\alpha$), each borehole comprising an internal toothing, pushed onto an external toothing of the shaft; wherein every plate or partial laminated core comprises multiple coolant passages arranged distributed around the center (Z) of the borehole, wherein the angle offset of two adjacent coolant passages corresponds to the rotation angle ($\alpha$) and an angle offset of the internal toothing, such that independently of the rotation angle, all coolant passages of every plate or partial laminated core are parallel to the shaft, located axially aligned with one another and extend axially through the rotor.

* * * * *